US007956743B2

(12) United States Patent
Mosteller

(10) Patent No.: US 7,956,743 B2
(45) Date of Patent: Jun. 7, 2011

(54) DUAL COMMUNICATION FOB ASSEMBLY COMPRISING AN INSERT WITHIN A BASE

(75) Inventor: Barry Mosteller, Downingtown, PA (US)

(73) Assignee: Oberthur Technologies, Levallois-Perret (FR)

( * ) Notice: Subject to any disclaimer, the term of this patent is extended or adjusted under 35 U.S.C. 154(b) by 698 days.

(21) Appl. No.: 11/770,984

(22) Filed: Jun. 29, 2007

(65) Prior Publication Data

US 2009/0002167 A1    Jan. 1, 2009

(51) Int. Cl.
*G08B 13/00* (2006.01)
(52) U.S. Cl. ............... 340/572.1; 340/10.1; 340/10.5
(58) Field of Classification Search ............... 340/572.1, 340/572.8, 572.9, 10.1, 693.5, 693.9, 693.12; 343/700 R, 701, 725; 257/678, 679, 680, 257/685, 686, 723, 724, 725, 726, 787, 788, 257/789, 790, 791, 792, 793, 794, 795, 796; D09/679, 672; D14/388, 341, 344, 346, D14/432, 433, 434, 435, 436, 437, 438, 439, D14/440, 441, 442, 443, 444, 445, 446, 447
See application file for complete search history.

(56) References Cited

U.S. PATENT DOCUMENTS

| 5,986,562 | A   | * | 11/1999 | Nikolich ............... 340/693.5 |
| 6,016,676 | A   | * | 1/2000  | McConnell ............... 70/408 |
| 7,000,842 | B2  | * | 2/2006  | Yamaguchi et al. ........ 235/486 |
| 7,287,695 | B2  | * | 10/2007 | Wankmueller ............. 235/383 |
| 7,301,442 | B2  | * | 11/2007 | Kolpasky et al. ........ 340/426.13 |
| 7,375,631 | B2  | * | 5/2008  | Moskowitz et al. ....... 340/572.1 |
| D574,145  | S   | * | 8/2008  | Phillips ................. D3/208 |
| 7,463,134 | B1  | * | 12/2008 | Stilley ................. 340/5.61 |
| 7,533,826 | B2  | * | 5/2009  | Phillips ............... 235/486 |
| 2004/0223305 | A1 | * | 11/2004 | Amiot et al. ........... 361/737 |
| 2006/0208066 | A1 | * | 9/2006  | Finn et al. ............ 235/380 |
| 2007/0080811 | A1 | * | 4/2007  | Venderley et al. ........ 340/572.8 |
| 2007/0152829 | A1 | * | 7/2007  | Lindsay et al. .......... 340/572.3 |

\* cited by examiner

*Primary Examiner* — Travis R Hunnings
(74) *Attorney, Agent, or Firm* — Young & Thompson

(57) ABSTRACT

A dual communication fob assembly provided with an attachment area for a ring or a chain and including in combination: an insert including a first contactless communication device; and a base with a pocket in the base for holding at least a part of the insert when inserted therein and being provided with a second contactless communication device which is electrically separate from the first contactless communication device.

2 Claims, 3 Drawing Sheets

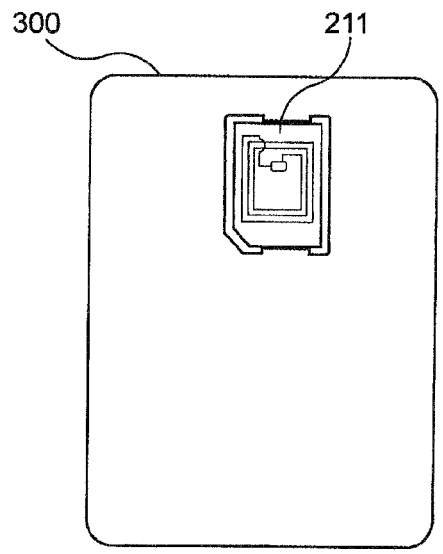
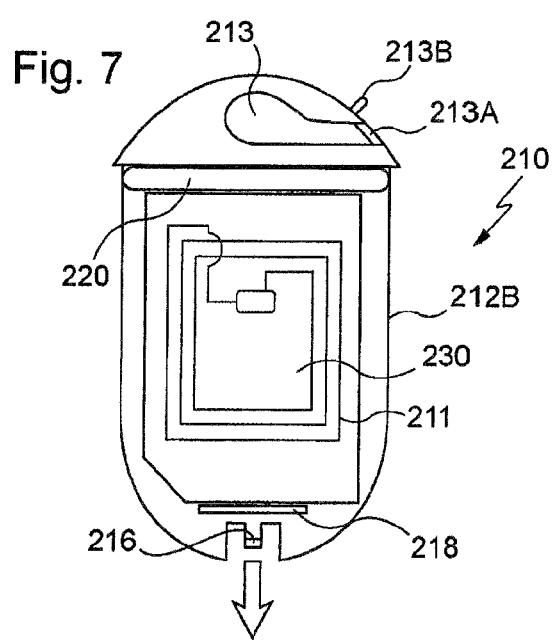
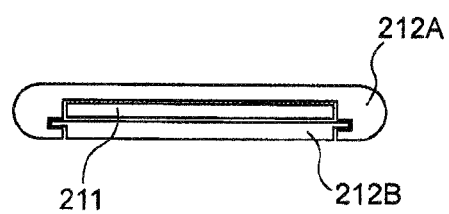
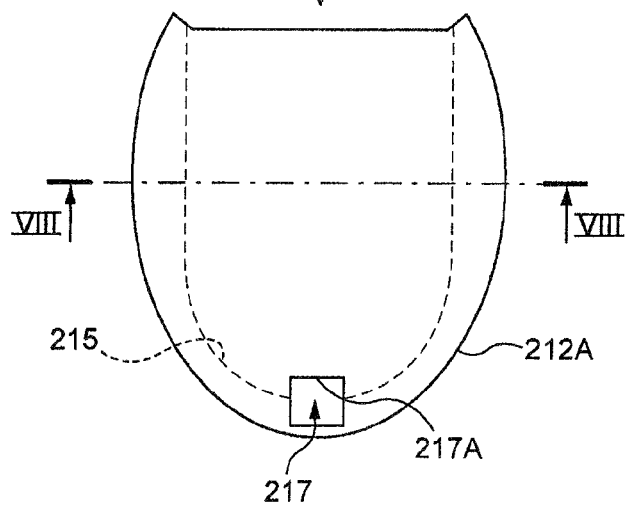

DUAL COMMUNICATION FOB ASSEMBLY COMPRISING AN INSERT WITHIN A BASE

FIELD OF THE INVENTION

The invention relates to a dual communication fob assembly comprising an insert within a base.

BACKGROUND OF THE INVENTION

Portable devices have been provided with short-range communication means, generally called RFID tags (for Radio Frequency Identification tags), mainly for identification purposes. Such tags generally comprise an integrated circuit for storing and processing information, modulating/demodulating RF signals, as well as an antenna for transmitting or receiving such RF signals; however recent RFID tags no longer include chips, which allows such tags to be printed on supports.

A compromise between several requirements (safety: preventing any communication which is not decided by the holder (or user), light weight, etc.) leads to consider that short-range communication corresponds to not more than one meter between the portable device and a complementary communication station. Preferably, this short-range may be chosen to be not more than 50 centimeters, or more preferably not more than 25 centimeters. This provides that no communication will take place without a voluntary movement of the bearer of the portable device.

Such portable short-range communication devices have also been proposed in the field of payment; an example of such a device is a device called "speedpass™" for payment at fuel dispensers or for motorway tolls.

Other portable communication devices are microcircuit cards (or chip cards) provided with an antenna. Such microcircuit cards are generally compliant with a standard, such as ISO 7816, with a thickness of 0.76 mm. Several main formats have been used, such as format ID-1, corresponding to a format used for payment cards (several centimeters for each dimension), and format ID-000 which is smaller, typically called SIM card in mobile phones. Such smaller chip cards may be cut within larger cards, for the sake of ease of production.

An example of such a small microcircuit card assembly is disclosed in US-2004/0223305, concerning the separation of a small card from a larger member and insertion of this small card in a base; this base may be a key fob wherein the antenna of the microcircuit card may be operated without being extracted from this fob.

Another example is disclosed by US-2005/258245 which relates to radio-frequency fobs and to methods of using same. More specifically, this reference discloses fobs provided with radio frequency functionality such that information, such as payment information, identification information or other like information may be wireless transmitted from a memory within the fob to a receiver; this functionality is generally provided by a microchip or other memory means, and/or antenna which is located on or within an insert and encased within an enclosure in an interior compartment; the fob may be provided with a quick-release mechanism for easily attaching to and detaching from a securing means, such as a keychain or the like; the interior compartment may be easily accessible for replacing the insert contained therein.

A problem is that a holder/user may own several portable short-range communication devices, which may appear, when taken as a whole, quite cumbersome and heavy, in particular when been located in a holder's pocket, with a significant risk of loss of one of such devices.

It shall be noted here that a chip device is generally considered as remaining the property of the company which personalized this chip device, rather than the property of the user. A consequence is that no card element bearing chips from different origins (distributors) currently exists.

SUMMARY OF THE INVENTION

An object of the invention is to overcome the above drawbacks by allowing several wireless communication devices to be located in a minimum volume.

Another object of the invention is to allow a user to combine chip devices from different distributors within a single unit.

Another object of the invention is to allow a user to combine chips of different 3D shapes within a single unit.

For these purposes, the invention teaches a dual communication fob assembly provided with an attachment area for a ring or a chain and comprising in combination:

an insert comprising a first contactless communication device and a base with a pocket in said base for holding at least a part of said insert when inserted therein, and being provided with a second contactless communication device which is electrically separate from the first contactless communication device.

Preferably, the first and second contactless communication devices are short-range communication devices, adapted for communication at a range of no more than one meter, more preferably no more than 50 cm and more advantageously no more than 25 cm. It is within the skill of the man of the art to select contactless communication devices having the needed range of communication.

Advantageously, at least one (preferably both) of the first and second contactless communication devices are embedded in transparent or translucent materials so as to provide visual access to a holder/user. This allows an easy control of the integrity of the communication device.

Preferably, the pocket of the base is adapted to accommodate the whole of the insert, which provides a complete protection of the insert; the attachment area is then preferably provided on the base (as an alternative, the attachment area may be the only part of the insert which extends outside the pocket). In such case, it is advantageous that the pocket of the base comprises a substantially flat slot and that the at least a part of the insert comprises a substantially flat portion adapted to be engaged into the slot, and that the attachment area is preferably provided at an entry of the slot so that the insert is kept within the slot when a ring or a chain is in place in this attachment area; thus the holding of the insert within the base is secure as long as the fob is attached to a ring or to a chain.

Instead of being a single piece, the base may comprise (at least) two complementary parts which determine together a pocket which is closed with respect to outside (no slot extending to the outer surface).

Preferably, the pocket of the base comprises a substantially flat slot and the at least a part of the insert comprises a substantially flat portion adapted to be engaged into the slot. This allows, in particular, the provision of efficient planar antennas. It is then advantageous that this substantially flat portion is provided with a substantially planar antenna which is a part of the first contactless communication device.

For efficient protection it is preferred that the substantially planar antenna is embedded within this substantially flat portion. This substantially planar antenna is advantageously embedded in a portion of this substantially flat portion which is translucent or transparent so as to allow a visual control of the integrity of the antenna.

Such a substantially planar contactless communication device (the first one and/or the second one) is advantageously compliant with ISO 14443.

Advantageously, at least a portion of the base provides at least a visual access to the first contactless communication device when the at least a part of the insert is inserted in the pocket (it allows a visual control of the integrity of this first contactless communication device when same is at the surface of the insert or embedded in a transparent or translucent material of this insert. Preferably, when the inserted portion of the insert is a substantially flat portion, the base provides an at least visual access to each face of said at least a part of the insert when engaged within the slot. Such visual access may be provided by an open window or by a transparent/translucent window.

Advantageously, the second contactless communication device comprises a substantially planar antenna provided a substantially planar face of the base, what helps to provide an efficient communication.

As an alternative, this second contactless communication device may comprise a cylindrical body, such as the contactless communication devices used in the "speedpass" system. In such case, it is preferred that the thickness of the assembly is substantially equal to the diameter of this cylindrical body.

Preferably, the second contactless communication device is buried or embedded within the material of the base; the latter is preferably, at least in the portion where the device is embedded, translucent or transparent.

As an alternative, the first contactless communication device may comprise a cylindrical body. In such case, this cylindrical body is located outside the pocket, so as to allow the pocket to have a flat, non cumbersome, shape. As an example, the pocket is a slot and the cylindrical body extends along the entry of the slot of the base, which helps to provide efficient sealing of the entry of the slot.

Such a cylindrical contactless communication device (the first one and/or the second one) is preferably compliant with ISO 15693.

Preferably, this first contactless communication device is buried or embedded in the material of the insert, in a portion which is preferably translucent or transparent.

Preferably, the corresponding second contactless communication device comprises a substantially planar antenna. As an alternative, this second contactless communication device may be a cylindrical body, for example provided at the end of the pocket receiving the insertable portion of the insert.

The corresponding second contactless communication device is preferably buried in the material of the base, advantageously in a portion where the material of the base is translucent or transparent.

The insert may be produced as a detachable part of a preliminary base compliant with the ID-1 format, and this insert may be compliant with the ID-000 format (SIM card).

It is advantageous that at least one (preferably both) of the first and second contactless communication devices comprises a cryptographic micro circuit cooperating with an antenna. This allows ensuring that no unwanted communication takes place.

BRIEF DESCRIPTION OF THE DRAWINGS

Objects, features and advantages of the invention are disclosed in the following description, given as exemplifying non-limitative embodiments, with respect to enclosed drawings wherein:

FIG. 7 is plan view of another embodiment with a two-part base, FIG. 8 is a view taken along line VIII-VIII of FIG. 7, when the insert is located within the closed two-part base, and FIG. 9 is a plan view of a base from which the insert of FIGS. 7 and 8 may be detached.

DETAILED DESCRIPTION OF THE INVENTION

Figure 1:
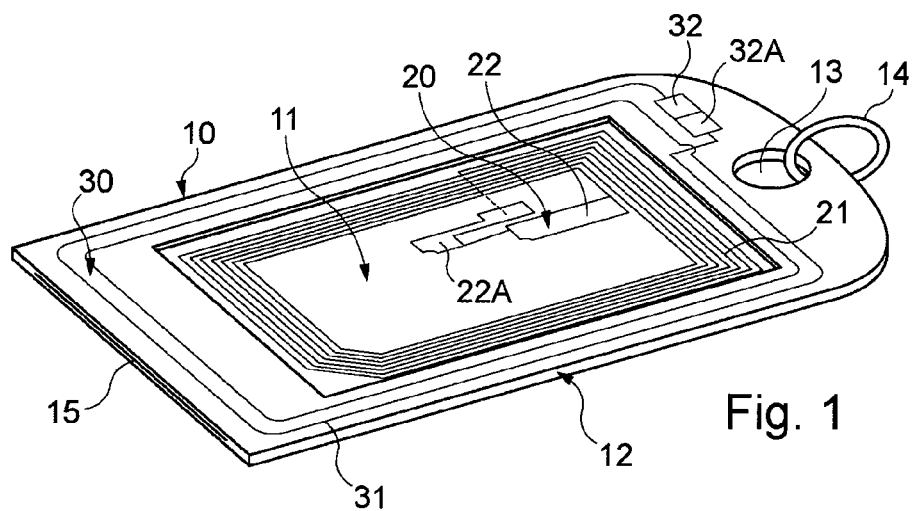
FIG. 1 is a perspective view of an assembly according to the invention, with an insert fully enclosed within a base.
Figure 2:
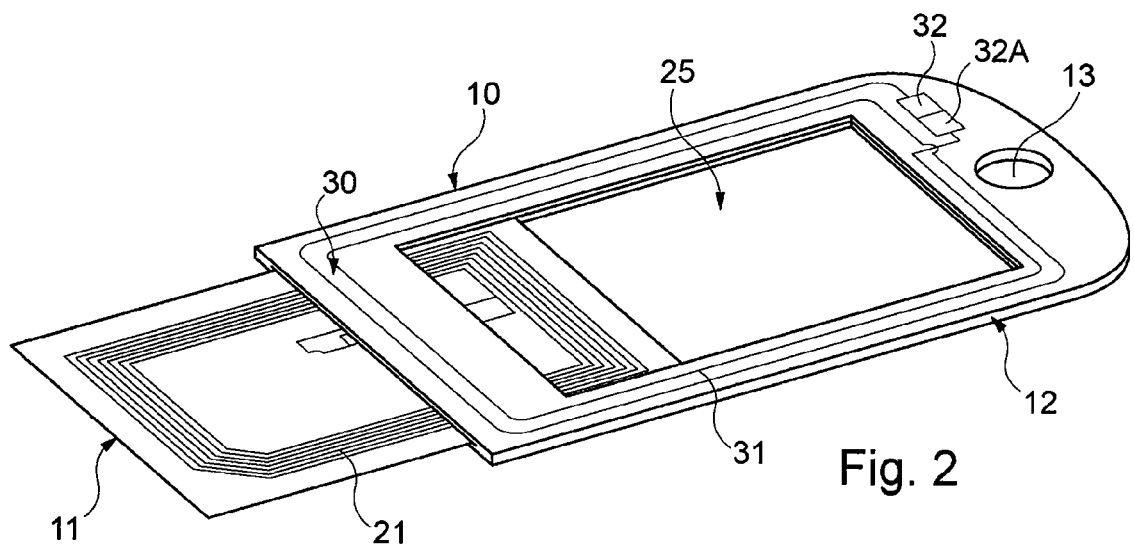
FIG. 2 is a similar perspective view, with the insert partly extracted from the base.

FIGS. 1 and 2 disclose an example of a dual communication fob assembly according to the invention, referred to as 10, comprising an insert 11 and a base 12 provided with a pocket for holding at least a portion of this insert when inserted therein.

Since it is a fob, it is provided with an attachment area 13 for a ring or a chain or the like (in this example, it is a simple hole and a ring 14 is shown in FIG. 1).

In this embodiment, the pocket of the base comprises a substantially flat slot 15 and the at least a part of the insert comprises a substantially flat portion adapted to be inserted in this slot. More precisely, this slot is of a constant thickness and the insert is a plate of constant thickness (for example the thickness of the ID-1 or ID-000 format, i.e. about 0.76 mm).

In this embodiment, the insert is inserted in its entirety in the slot.

Both the base and the insert comprise contactless communication devices. These devices have preferably a short range which means that the range of each of these devices is no more than one meter, preferably, no more than 50 cm, more preferably no more than 25 cm. These contactless communication devices are electrically separate; in other words, these devices are independent and can be operated independently, i.e. these devices are electrically and magnetically disconnected.

The first contactless communication device, referred to as 20, comprises here an antenna 21 as well as a microcircuit 22, which preferably comprises a cryptographic portion, referred to as 22A.

This antenna is formed of a plurality of loops, the dimension and the number of which determine the performances of the communication device.

This antenna, together with the microcircuit and any other part of this first contactless communication device, may be located on a surface of the insert. However, in the disclosed embodiment, this first contactless communication device is preferably embedded in the insert, in a portion of this insert which is transparent so that it is easy to visually countercheck the integrity of the device. This portion may be only translucent.

This transparent or translucent portion may be only a part of the insert but can also correspond to the whole of the insert, so as to allow a visual inspection of the device from both sides of the insert.

In FIGS. 1 and 2, the base provides at least a visual access to this first contactless communication device. More precisely, the base is provided with two windows (one of which is referred to as 25 in FIG. 2) which provide a complete access to each side of the insert. Of course, one window may be enough and this single window (or both windows) may be transparent portion(s).

The second contactless communication device, referred to as 30, also comprises a substantially planar antenna 31, here comprising a plurality of loops, and a microcircuit 32. This microcircuit also comprises a cryptographic portion 32A.

It is within the normal skill of the man of the art to select an appropriate microcircuit according to his/her needs of security, in compliance with the complementary communication stations with which first and second contactless communication devices 20 and 30 are intended to exchange data and information.

This second contactless communication device may be located on a surface of the base but it is preferred that it is embedded within a portion of the base and it is advantageous that this portion is transparent (as in FIGS. 1 and 2) or at least translucent. The whole of the base may be transparent or translucent.

The antenna 31 is, in the example of FIGS. 1 and 2, located along the periphery of the base, i.e. along the outer periphery of the window 25; this helps to keep both antennas independent. It shall be understood that the antenna, despite being substantially planar, may comprise superposed pluralities of loops and, if the base only comprises an upper open window, these pluralities may extend below the insert.

Figure 3:
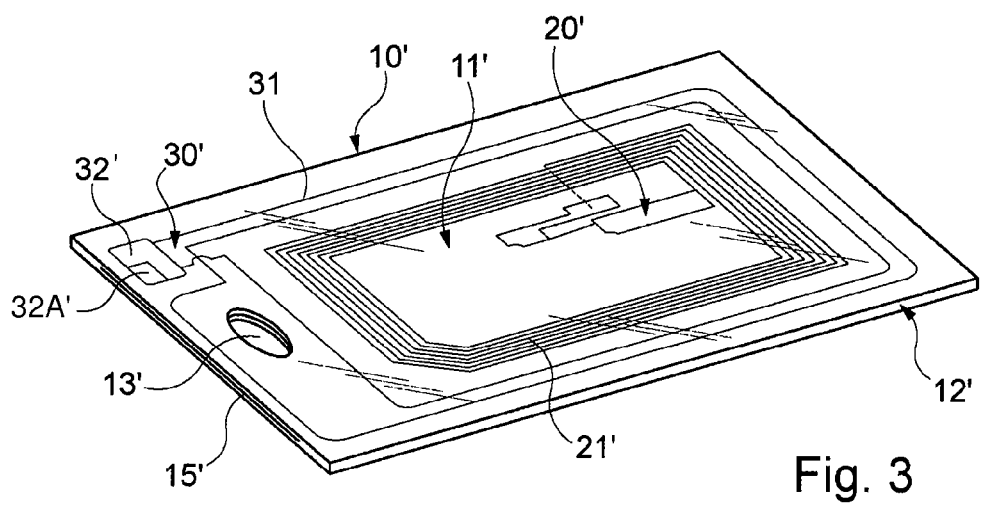
FIG. 3 is a similar perspective view of another embodiment of an assembly according to the invention.

FIG. 3 discloses another embodiment of a dual communication fob assembly according to the invention where elements similar to those of FIGS. 1 and 2 are referred to by numerals deriving from those used in FIGS. 1 and 2 by the addition of the exponent "prime".

Thus, this second dual contactless communication device 10' comprises an insert 11' and a base 12', a first contactless communication device 20' and a second contactless communication device 30'.

However, whereas the attachment area of FIGS. 1 and 2 is located near the far end of the slot, the attachment area 13' of this second device 10' is located near the entry of the slot 15', taking advantage of the fact that the insert may be fully inserted in the slot and the fact that the slot is longer than this insert.

As a consequence, when the insert 11' is fully inserted in the base 12', the hole 13' is again free and can accommodate a ring or a chain as in FIG. 1, with the result that, when such a ring or a chain is in place, the insert can no longer be extracted from the base, what prevents loss or theft.

Figures 4, 5, 6:
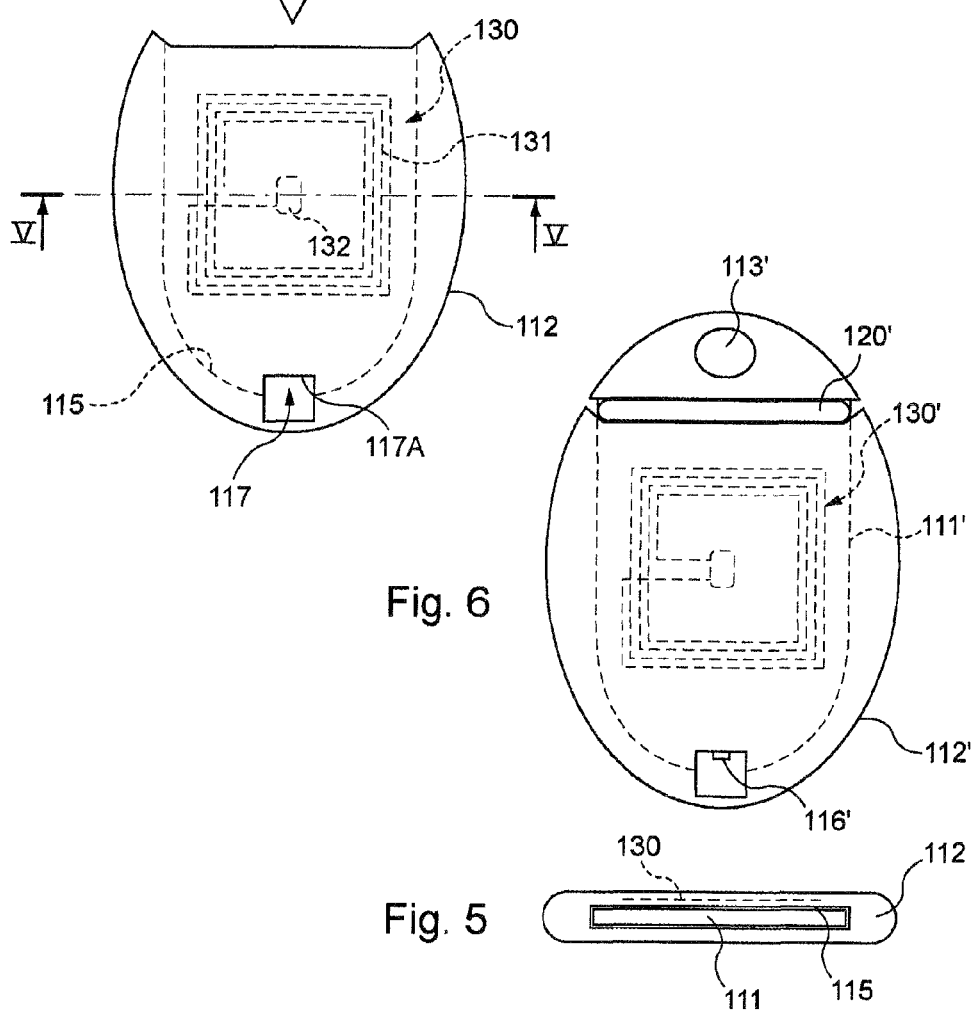
FIG. 4 is a plan view of another embodiment with the insert fully extracted from the base.
FIG. 5 is a view taken along line V-V of FIG. 4, when the insert is inserted within the base.
FIG. 6 is a plan view of another embodiment with the insert fully engaged in the base.

FIGS. 4 and 5 disclose another embodiment, where elements similar to those of FIGS. 1 and 2 are referred to by numerals which derive from those of these FIGS. 1 and 2 by the addition of the number "100".

This dual communication fob assembly 110 comprises an insert 111 and a base 112, a first contactless communication device 120 on the insert and a second contactless communication device 130 on the base.

In this embodiment, the first contactless communication device 120 comprises a cylindrical body including the whole device 120, for example a cylindrical body similar to that used in the system known as "speedpass".

It shall be noted that this cylindrical body has in practice a diameter greater than the thickness of a chip card, such as a card at the ID-1 format so that this cylindrical body cannot be easily incorporated in such a chip card.

It may be noted that, in this embodiment, the insert is not insertable in its entirety in the base and a portion remains outside this base. The first contactless communication device is carried by this outside portion.

As in the preceding examples, the base comprises a substantially flat slot 115 whereas the insert comprises a substantially flat portion adapted to be engaged in this slot. It may be noted that, in this example, the substantially flat portion is completely passive and does not include any part of the communication device.

However, the cylindrical body 120 extends along the entry of the slot 115 of the base when this substantially flat portion is engaged to its maximum.

The end of the part of the insert is provided with a hook element 116 whereas the base 112 comprises, at the end of the slot 115, an opening 117 with a side 117A adapted to cooperate with the hook element 116 when the insert is inserted to its maximum, with the result that the insert is locked into the base. In the present example, this hook element is accessible from outside so that the bearer of the fob assembly can, by pushing on the hook element, release so it can be extracted from the base. As an alternative, the opening may be replaced by a simple depression within the thickness of the end of the slot so that, when locked in the base, the insert can no longer be extracted from the base.

Dashed line 130 in FIG. 5 corresponds to the location of the second contactless communication device 130, which is thus substantially planar. More precisely, as shown in FIG. 4, this second contactless communication device comprises here a substantially planar antenna 131 comprising a plurality of loops, as in the preceding examples, as well as a microcircuit 132 which may or may not comprise a cryptographic portion (not shown).

The base is here made of a transparent material so that the second contactless communication device 130, which is embedded therein, can be visually inspected, as seen in FIG. 4.

It can be seen that in this example, the whole contactless communication device 130 is located in a flat portion of the base extending along the slot, but it is clear that this device may be constructed so that, for example, the antenna comprise two pluralities of loops located above and below the slot. This may make it easier to connect both ends of the antenna to the microcircuit 132.

As an alternative, the second contactless communication device 130 may also comprise a cylindrical body, for example located beyond the end of the slot, or on a side of this base along the slot (since the inserted part of the insert has no specific function other than fixation to the base, it can be made narrower so as to leave place for such a cylindrical body.

Preferably, the thickness of the fob assembly is substantially equal to the diameter of the cylindrical body 120.

Whereas, in the example of FIGS. 1 and 2, the attachment area consists of a simple hole, the attachment area 113 of the assembly 110 is a hole extended by a slot between the hole and the side of the insert, with a slider 113A normally closing this slot but which can be actuated, by pushing on a lug 113B integral with this slider to free the entrance in the hole.

FIG. 6 corresponds to an alternative of the fob assembly 110, where the elements similar to those of FIGS. 4 and 5 are referred to by numerals derived by addition of an exponent "prime". It differs from the embodiment of FIGS. 4 and 5 by the fact that the attachment area 113' is a simple hole, as in FIGS. 1 to 3.

FIGS. 7 and 8 disclose another embodiment according to the invention. Elements similar to those of FIGS. 4 and 5 are referred to by numerals derived by addition of the number "100".

This fob assembly 210 comprises an insert 211 and a two-part base 212 comprising an upper part 212A which has substantially the same shape as the base 112 of FIGS. 4 and 5 when viewed from above, and a lower part 212B which has substantially the same shape as the insert 111 of FIGS. 4 and 5 when viewed from above. However, as shown in FIG. 8, this lower part is provided with lateral ribs adapted to slide within inner grooves of the upper part, whereas the cooperation of these lower and upper parts define a slot as in FIG. 5.

In this example, the insert 211 is simply a plate carrying a contactless communication device 230 similar to device 130 of FIG. 4.

Lower part 212B of the base is here provided with a rib 218 for proper positioning of the insert on this lower part for insertion within the base.

Insert 211 may be produced when it is a part of a larger preliminary base, such as a base compliant with ISO 7816, or at least compliant with the dimensions of ID-1 format. An example of such preliminary base is disclosed in FIG. 9 under reference 300. In this example insert 211 is compliant with ID-000 format.

The substantially planar contactless communication device 130 or 230 is preferably compliant with ISO 14443 whereas the substantially cylindrical contactless communication device 20, 120 or 220 is preferably compliant with ISO 15693.

It shall be clear that the above embodiments have been described as examples only and that several alternatives can be proposed within the scope of the invention.

The invention claimed is:

1. A dual communication fob assembly provided with an attachment area for a ring or a chain and comprising in combination:
   an insert comprising a first contactless communication device and
   a base with a pocket in said base for holding at least a part of said insert when inserted therein, and being provided with a second contactless communication device which is electrically separate from the first contactless communication device,
   wherein
   the first contactless communication device comprises a cylindrical body, and the cylindrical body is located outside the pocket.

2. The fob assembly of claim 1, wherein the pocket is a flat slot adapted to receive a flat portion of the insert and the cylindrical body extends along the entry of the slot of the base.

* * * * *